(12) United States Patent
Franco et al.

(10) Patent No.: US 9,451,866 B2
(45) Date of Patent: Sep. 27, 2016

(54) WATER-USING DOMESTIC APPLIANCE WITH A CATALYTICALLY ACTIVE INTERIOR SURFACE AND METHOD FOR OPERATING THE SAME

(75) Inventors: Antonio Barrado Franco, Berlin (DE); Andreas Hanau, Berlin (DE); Hartmut Schaub, Brieselang (DE); Klaus Schepers, Braunfels (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 169 days.

(21) Appl. No.: 14/347,795

(22) PCT Filed: Sep. 14, 2012

(86) PCT No.: PCT/EP2012/068107
§ 371 (c)(1),
(2), (4) Date: Apr. 28, 2014

(87) PCT Pub. No.: WO2013/045294
PCT Pub. Date: Apr. 4, 2013

(65) Prior Publication Data
US 2014/0231363 A1    Aug. 21, 2014

(30) Foreign Application Priority Data
Sep. 28, 2011    (DE) .................. 10 2011 083 572

(51) Int. Cl.
*A47L 15/42* (2006.01)
*B08B 3/10* (2006.01)
(Continued)

(52) U.S. Cl.
CPC ............ *A47L 15/4236* (2013.01); *A47L 15/42* (2013.01); *B08B 3/10* (2013.01); *C02F 1/725* (2013.01);
(Continued)

(58) Field of Classification Search
CPC . A47L 15/42; A47L 15/424; A47L 15/4236; A47L 15/4291; A47L 15/4276; A47L 15/4114; A47L 15/4246; A47B 81/00; D06F 35/001; D06F 35/008; D06F 39/006; C02F 1/002; C02F 1/003; C02F 1/50; C02F 1/505; C02F 1/722; C02F 1/725; C02F 2101/308; C02F 2103/002; C02F 1/78; B08B 3/04; B08B 3/045; B08B 3/048; B08B 3/08; B08B 3/10; B08B 2203/005
See application file for complete search history.

(56) References Cited

U.S. PATENT DOCUMENTS 5,928,382 A    7/1999   Reinhardt et al.
2006/0276360 A1*  12/2006  Muradov ............... B01J 35/004
                                          510/240

(Continued)

FOREIGN PATENT DOCUMENTS

DE    10 2009 026712    12/2010
EP         0 761 809      3/1997
KR    10200 7006 6334    6/2007

OTHER PUBLICATIONS

International Search Report for PCT/EP2012/068107 mailed Feb. 4, 2013.
(Continued)

*Primary Examiner* — Lucas Stelling
(74) *Attorney, Agent, or Firm* — Nixon & Vanderhye P.C.

(57) ABSTRACT

The invention relates to a water-using domestic appliance comprising a tub for accommodating articles to be cleaned and at least one interior surface containing a catalytically active substance, said catalytically active substance being a polyoxometalate and the interior surface being likely to come into contact with water during operation of the domestic appliance. The invention further relates to a method for operating said domestic appliance.

15 Claims, 1 Drawing Sheet

(51) Int. Cl.
*C02F 1/72* (2006.01)
*C02F 1/78* (2006.01)
*D06F 35/00* (2006.01)
*C02F 103/00* (2006.01)
*D06F 39/00* (2006.01)

(52) U.S. Cl.
CPC ............... *C02F 1/78* (2013.01); *D06F 35/008* (2013.01); *A47L 15/424* (2013.01); *A47L 15/4214* (2013.01); *A47L 15/4246* (2013.01); *A47L 15/4276* (2013.01); *A47L 15/4291* (2013.01); *B08B 2203/005* (2013.01); *C02F 2103/002* (2013.01); *D06F 35/001* (2013.01); *D06F 39/006* (2013.01)

(56) References Cited

U.S. PATENT DOCUMENTS

2007/0254824 A1\* 11/2007 Coke .................... C11D 3/0052
510/406
2009/0230038 A1\* 9/2009 Tanaka .................... C02F 1/725
210/150
2012/0055513 A1 3/2012 Eglmeier et al.

OTHER PUBLICATIONS

Written Opinion of the International Searching Authority mailed Feb. 4, 2013 (foreign language).

\* cited by examiner

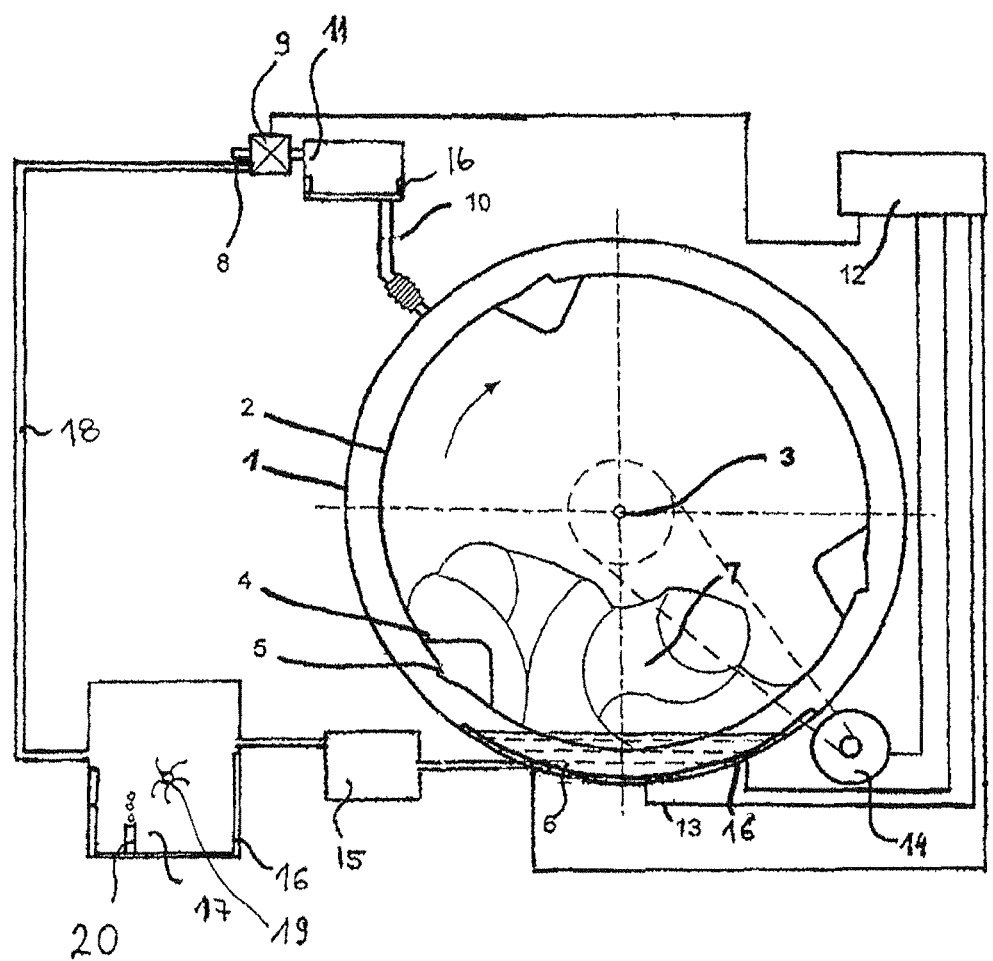

WATER-USING DOMESTIC APPLIANCE WITH A CATALYTICALLY ACTIVE INTERIOR SURFACE AND METHOD FOR OPERATING THE SAME

This application is the U.S. national phase of International Application No. PCT/EP2012/068107 filed 14 Sep. 2012 which designated the U.S. and claims priority to DE 10 2011 083 572.5 filed 28 Sep. 2011, the entire contents of each of which are hereby incorporated by reference.

The invention relates to a water-bearing household appliance with a catalytically active interior surface and a method for operating the same. In particular, the invention relates to a water-bearing household appliance comprising a tub for accommodating articles to be cleaned and at least one catalytically active substance-containing interior surface and a method for operating the same.

In general, articles which have been soiled in various ways are cleaned in water-bearing household appliances. Food remains therefore arise in dishwashers and the range of dirt occurring in laundry items to be cleaned in washing machines is typically even greater. Something that all water-bearing household appliances have in common is that in the damp and warm atmosphere, in particular at less accessible sites, dirt can arise and accumulate. This dirt can be a good nutrient medium for microorganisms such as bacteria or fungi.

A hygiene problem exists, particularly where water remains in a household appliance. Therefore, in a laundry treatment device, for example, a washing machine, when a water reservoir is used or on frequent use of washing programs with cold liquors, during long pause phases with the door closed or under unfavorable siting conditions, dirt can arise, particularly the formation of biofilms comprising organic substances such as microorganisms and nutrients. Said biofilms lead to bad odors and/or visible dirt. Pathological effects are even conceivable. Biofilms form particularly in areas of washing machines in which water is present for long periods, that is, during pause phases. Such areas include poorly ventilated areas such as ribs, pockets, folds in seals, water inflows and outflows and, most particularly, water reservoirs which serve to store the greywater arising in the washing and rinsing process for re-use in a later washing or rinsing process. It is therefore desirable to sanitize the water in a household appliance and to prevent the formation of biofilms.

Various measures for removing and/or preventing biofilms are known from the prior art. In particular, sometimes, machine cleaning programs are offered which remove built-up dirt at high temperatures with the assistance of washing agents and sometimes with increased liquor levels and/or at raised drum rotation speeds, i.e. with an increased input of mechanical energy. Also known is the use of ozone to remove organic dirt.

It has also previously been proposed to remove organic dirt with the aid of UV-C radiators using a throughflow principle, the removal taking place in such a manner that microorganisms in such dirt are finally killed by damaging their genetic material. Photocatalytic methods are also known, for example, the use of titanium dioxide coatings for deodorizing, disinfecting and cleaning. In this process, the catalyst needs to be activated by means of UV radiation.

Also known are measures for killing microorganisms using Ag+ or Cu+ ions in the washing liquor and on the surfaces of the materials coming into contact with the washing liquor.

Other methods are directed to thermal killing of any microorganisms present by increasing the temperature at the surfaces of the components coming into contact with the washing liquor, via direct or indirect energy transfer (water, steam, microwaves).

A disadvantage of these known methods and measures is the high energy usage and the sometimes high apparatus and/or operating costs for achieving truly relevant effects. In the case of the use of $Ag^+$ or $Cu^+$ ions, disadvantageous effects with regard to groundwater and waterway pollution also arise. In some methods, potentially health-endangering agents, for example, ozone or UV radiation, are used so that additional safety measures are required.

The use of polyoxometalates in various fields is known, for example, in analytical and clinical chemistry, in catalysis (including photocatalysis), in biochemistry (inhibition of electron transfer processes), in medicine (antitumor and antiviral activity) and in the manufacturing of integrated circuits. Polyoxometalates are known as oxidation catalysts most of all in the paper and plastics industry.

Polyoxometalates are inorganic metal-oxygen clusters. In general, polyoxometalates possess polyatomic anions which are built up from three or more transition metal oxyanions, in particular, tungstate, molybdate, vanadate, niobate and/or tantalate and are bridged via oxygen atoms. Polyoxometalates can form a large three-dimensional network structure with defined oligomer or polymer structural elements.

Polyoxometalates are subdivided, depending on their structure, into isopolyoxometalates and heteropolyoxometalates. Isopolyoxometalates are the simplest forms of polyoxometalates and can be described as binary oxide anions, i.e. containing only metal ions and oxygen. Typical examples of such isopolyoxometalates are $[Mo_2O_7]^{2-}$, $[W_6O_{24}]^{12-}$, $[Mo_6O_{16}]^{2-}$, $[Mo_{36}O_{112}]^{8-}$. As distinct therefrom, heteropolyoxometalates, which are used on a large scale as oxidation catalysts, contain further non-metal, semi-metal and/or transition metal ions. Thus, for example, transition metal-doped, so-called Keggin anions having the formula $[APW_{11}O_{39}]^{7-/8-}$, where A=Zn, Co, Ni, Mn, and Dawson anions $[AP_2W_{17}O_{61}]^{7-/8-}$, where A=Mn, Fe, Co, Ni, Cu are known and can additionally have bound water of crystallization. Further substitutions, including different transition metal ions, are known, for example $[WZnMn_2(ZnW_9O_{34})_2]^{12-}$. The charge equalization of the aforementioned anions takes place either via protons, by means of which the corresponding polyacids are obtained, or via cations, forming corresponding salts of the polyacids (heteropolyoxometalates).

The expression "polyoxometalate" used herein covers both salts of the polyacids and the corresponding polyacids themselves.

The use of polyoxometalates as bleaching catalysts in the household environment is known. In bleaches, the structure of a dye is destroyed by a strong oxidizing agent (bleaching agent). Known best are bleaching agents based on oxygen, for example, peroxides and bleaching agents based on chlorine. In order to strengthen the effect of the relatively mild bleaching agents, particularly at washing temperatures of up to 60° C., the use of bleach activators and/or bleach catalysts is known.

EP 0 761 809 B1 discloses a bleaching agent composition containing polyoxometalates as bleaching agent catalysts. Even in small quantities, polyoxometalates enhance the effectiveness of bleaching agents such as hydrogen peroxide, inorganic and organic peroxy acids and caroates. The bleaching agent composition described comprises bleaching agents (peroxide) and bleaching agent catalysts (polyoxometalates) and can be used, for example, in washing agents, cleaning agents, disinfecting agents and denture cleaners.

EP 1 141 210 B1 discloses a method for bleaching laundry items or household surfaces wherein a washing agent which contains polyoxometalates is brought into contact with the soiled substrate. Air serves as the primary source of oxygen atoms for bleaching.

WO 2005/059226 A1 discloses a method for washing laundry items in a washing machine, the ion concentration of the washing liquor being changed during a washing process in order to optimize the cleaning capacity of the washing liquor. The washing liquor can contain a bleaching agent system. In this context, inorganic polyoxometalates are described as bleaching oxidation catalysts with peroxide bleaching agents and air.

DE 10 2009 026 712 A1 discloses a household appliance having at least one component which has a surface that can be affected by organic dirt, said surface having a photocatalyst, a photosource for irradiating the photocatalyst with an activating electromagnetic radiation being associated with said surface, the surface being formed from a primary formed first material in which the photocatalyst is dispersed. Materials with titanium dioxide and modifications thereof are disclosed in great detail as photocatalysts.

Against this background, it is an object of the present invention to provide a water-bearing household appliance and a method for operating said appliance wherein dirt can be removed or prevented in a simple and particularly hygienic way or at least largely removed or prevented. Preferably, dirt with microorganisms is to be removed or prevented.

The object is achieved according to the invention with a water-bearing household appliance and a method for operating the same, having the features of the corresponding independent claims. Preferred embodiments of the household appliance according to the invention are disclosed in the corresponding dependent claims. Preferred embodiments of the household appliance according to the invention correspond to preferred embodiments of the method according to the invention and vice versa, even if not explicitly stated herein.

The subject matter of the invention is therefore a water-bearing household appliance comprising a tub for accommodating articles to be cleaned and at least one catalytically active substance-containing interior surface, the catalytically active substance being a polyoxometalate, wherein the interior surface can come into contact with water during operation of the household appliance.

In general, a water-bearing household appliance is a household appliance during the operation of which water is used. The items to be cleaned can be, in particular, tableware or laundry items. Cleaning should according to the invention also be understood to mean freshening.

The inventive water-bearing household appliance enables the water in the household appliance to be treated in an efficient, economical and environmentally-friendly way such that organic substances like microorganisms and nutrients are decomposed and therefore a biofilm in the household appliance can be counteracted. In this way, the property of polyoxometalates as oxidation catalysts, in particular, is utilized. In the presence of an oxidizing agent such as oxygen, hydrogen peroxide or ozone, oxygen radicals (or oxygen-containing radicals, hereinafter referred to altogether as "oxygen radicals") form at the polyoxometalate-containing interior surface of the household appliance. Due to the chemical reactivity thereof, said oxygen radicals can decompose organic compounds in particular and are consequently harmful to microorganisms. In this way, organic substances in the water which is brought into contact with the interior surface of the household appliance coated with the polyoxometalate are decomposed and therefore a biofilm is counteracted.

The polyoxometalates used according to the invention include the aforementioned polyoxometalates and the polyoxometalates disclosed in EP 0761 809 B1 and EP 1 141 210 B1.

Preferably the polyoxometalate is a tungstate. Said tungstate can be an isopolytungstate or a heteropolytungstate. Particularly preferably, a titanium-modified tungstate is used.

The polyoxometalate-containing surface can be created in any way, provided the catalytic effect according to the invention is possible. Thus, for example, said surface can be created by forming a polyoxometalate-containing film or, for example, by placing polyoxometalate particles at the surface of a porous material. The production thereof depends, in particular, on the location and manner of use.

It is preferred, according to the invention, for the polyoxometalate-containing surface to have a thickness of not more than 50 µm and particularly preferably a thickness of not more than 10 µm.

During the oxidation reaction, the polyoxometalate serves, in general, as an oxidation catalyst which cooperates with an oxidizing agent. The oxidizing agent is not limited according to the invention. Preferably, oxygen-containing oxidizing agents are used. Oxygen, inorganic or organic peroxides and/or ozone are particularly preferred as oxidizing agents. Oxygen is again particularly preferred thereamong as an oxidizing agent since by this means, an additional input of possibly harmful or interfering substances can be avoided. Air, in particular, is used as a source of oxygen. If organic peroxides are used as oxidizing agents, then peroxides already present in washing agents are preferred.

Ozone is preferred as an oxidizing agent in household appliances having an ozone generator. Household appliances of this type preferably have an ozone removal device.

In order to enable a continuous oxidation reaction, a sufficient level of mobility of the oxidizing species, for example, of oxygen radicals which have been generated at the polyoxometalate-containing interior surface acting as an oxidation catalyst should be provided. Furthermore, a sufficiently high concentration of oxidizing agent should be present in the water to be treated in order to achieve a sufficient hygienic effect.

In the household appliance according to the invention, any interior surfaces can contain polyoxometalates, provided said surfaces can come into contact with water during operation of the household appliance. Preferably according to the invention, at least one interior surface comes into contact with flowing or static water during operation of the household appliance. The contact is necessary, since organic substances in the water of the household appliance are oxidized due to contact with the polyoxometalate-containing surface and are thereby decomposed.

Therefore according to the invention, such interior surfaces of the household appliance which come into contact with moving water are suitable for polyoxometalate coating, for example, water feed systems, throughflow elements or tubs for accommodating items to be cleaned such as the outer tub in a washing machine or in a dishwasher.

In a preferred embodiment of the water-bearing household appliance, the at least one interior surface is provided at an interior wall and/or at a throughflow element of the household appliance.

Preferably, the at least one interior surface which contains polyoxometalate is arranged in the water feed system. The expression "water feed system" should be understood to mean the parts of the household appliance which serve for the feeding of water into the appliance, for example, a valve and a feed pipe in the washing machine or the dishwasher. In this way, the water taken into the appliance is already hygienized. Also involved are regions of the appliance having a relatively high water mobility, which therefore enable an advantageous reaction sequence.

In a further preferred embodiment of the invention, the at least one interior surface is arranged on a throughflow element of the household appliance. Throughflow elements are understood, in general, to be components which are mounted in the flow stream of water in the household appliance. Said components are preferably grid-like or filter-like structures. According to the invention, existing throughflow elements already present in the household appliance for other purposes may be provided with a polyoxometalate-containing interior surface or additional polyoxometalate may be provided on throughflow elements in the household appliance which have an interior surface. In this case, "interior surface" is used to mean that the surface of the throughflow elements is situated in the interior of the household appliance.

In the case, also, of polyoxometalate-coated throughflow elements, the high mobility of the water is advantageously utilized for the reaction. In addition, throughflow elements are particularly advantageous due to the relatively large surface area thereof and therefore the large area of contact thereof with the water. Furthermore, by means of a simple modification, the polyoxometalate-containing interior surface can be further enlarged in the case of throughflow elements and turbulences, which are advantageous for the oxidation reaction, can be generated in the water flow.

In order to ensure the most complete reaction possible, the greatest possible contact area of the water with the interior surface containing polyoxometalate is preferable. This can be achieved according to the invention by mounting surface area-increasing structures such as protuberances, grid-like structures, additional plates, etc. at the interior polyoxometalate-containing surface, so that overall a larger polyoxometalate-containing surface can be provided. When suitably mounted in the flow stream of water, such surface area-increasing structures can also advantageously provide for additional turbulence and therefore mobility and, when oxygen is used, provide the supply of oxygen.

In a particularly preferred embodiment, the interior polyoxometalate-containing surface is an interior surface of a water reservoir. In household appliances such as washing machines and dishwashers, water reservoirs can be provided in order to store greywater, that is slightly dirty waste water, from the laundry and/or dishwashing process and to use said water again in later laundry and/or dishwashing processes. This is advantageous for environmental and economical reasons. However, due to microorganisms present in the water, if stored for a relatively long period, the hygienic state of the water changes. Particularly in the case of greywater from laundry or dishwashing processes, the nutrients contained therein favor the growth and spreading of microorganisms. The storage of greywater over relatively long periods in household appliances having a water reservoir has therefore previously been problematic.

Consequently, an interior surface of the water reservoir containing a polyoxometalate enables the hygienic storage of the stored water over a relatively long period. In this way, greywater from the laundry or dishwashing process can be stored without loss of the hygienic properties over a relatively long period. The arrangement of the interior surface of the water reservoir containing polyoxometalate is not restricted according to the invention and involves modifications of the water reservoir which promote an improved reaction process. In the simplest case, the interior surface of the conventional water reservoir can be provided with a layer containing a polyoxometalate. In another embodiment, additional panels or protuberances in the water reservoir can provide an enlarged interior surface area and therefore an increased polyoxometalate-containing interior surface area. Furthermore, net-like or grid-like structures in the water reservoir are preferred and provide an increased interior surface area containing polyoxometalate.

In a further preferred embodiment, the water reservoir comprises a circulating element and/or an air infeed element. A circulating element is understood herein to be a component which is able to agitate (circulate) the water. In general, the circulation is achieved by mechanical means. An air infeed element is understood to be a component by means of which air can be introduced into the water reservoir. In this way, sufficient mobility of the oxidizing species created at the catalyst surface, for example, oxygen radicals is ensured in order to enable a continuing reaction. Furthermore, a sufficiently high oxygen concentration in the water is enabled in order to provide the most complete catalytic reaction possible.

The water-bearing household appliance is not limited according to the invention. Thus, for example, water boilers, coffee machines, steam irons, etc. come into consideration. In particular, the water-bearing household appliance is an appliance which can be connected to the domestic water supply. Preferably, the water-bearing household appliance is a dishwasher or a laundry treatment device. Particularly preferably, it is a laundry treatment device belonging to the group consisting of a washing machine and a washer-dryer.

A washing machine or a washer-dryer generally comprises, as well as a drum as the receiving container for the laundry items to be treated, an outer tub, a water feed system, a detergent dispenser tray for holding ready a laundry care product and a liquor waste system arranged at the bottom of the outer tub with a pump and possibly a water reservoir.

In a preferred embodiment, the washing machine or washer-dryer has an outer tub and/or a detergent dispenser tray with an interior polyoxometalate-containing surface. The outer tub and the detergent dispenser tray are regarded as being regions of the washing machine which are particularly susceptible to the deposition of biofilms due to a high input of organic substances resulting from the laundry care products and insufficient ventilation. The coating of polyoxometalates counteracts this formation of biofilms. Furthermore, in the detergent dispenser tray and in the outer tub during operation of the washing machine, the water has relatively high mobility so that an oxidation reaction can advantageously take place. In addition, a coating of polyoxometalate in the detergent dispenser tray and the outer tub brings the advantage that bleaching agents present in the laundry care products are activated by the polyoxometalates and that therefore a higher degree of effectiveness can develop. In this way, the laundry care products can be used in smaller dosages, resulting in economic and environmental advantages. Furthermore, in this embodiment, bleaching systems with polyoxometalate additives can be dispensed with.

A further object of the invention is a method for operating a water-bearing household appliance comprising a tub for accommodating articles to be cleaned and at least one catalytically active polyoxometalate-containing interior surface, which can come into contact with water during operation of the household appliance, wherein water to be cleaned is brought into contact with the polyoxometalate-containing surface.

In the presence of an oxidizing agent which, for example, can be present dissolved in, or mixed into water, oxygen radicals, for example, form at the polyoxometalate-containing interior surface of the household appliance. When these highly reactive oxygen radicals come into contact with organic substances present in the water, including microorganisms, an oxidation reaction which leads to the decomposition of the organic substances and/or to pathological processes in the microorganisms takes place. In this way, the formation of a biofilm is counteracted.

In a preferred embodiment, as mentioned in the introduction, an oxygen-containing oxidizing agent is used, in particular oxygen, wherein air serves as the source of oxygen. The oxygen may be present, for example, dissolved in the water. Furthermore, by means of a corresponding movement of the water, mixing of air and water can take place, for example, for the formation of air bubbles in the water and an air-water mixture of this type can be brought into contact with the polyoxometalate-containing surface, the atmospheric oxygen preferably serving as the oxidizing agent. Particularly preferably, an air infeed element provides a sufficient quantity of oxygen in the water to be treated.

In a further preferred embodiment, a peroxide or ozone is used as the oxidizing agent.

If a peroxide is used as the oxidizing agent, preferably, peroxide already present in the laundry care product is used. This saves the addition of further peroxide. Preferably, the polyoxometalate-containing surface is arranged in the detergent dispenser tray or in the outer tub, particularly preferably in the outer tub if peroxides serve as the oxidizing agent. The reason therefor is that peroxides are present particularly in heavy-duty washing agents and bleaching agents, although bleaching agents in particular are often added directly in the drum.

Preferably, the user of the laundry treatment device can specify, by means of option buttons, whether heavy-duty washing agents or bleaching agents have been added. Alternatively, the presence of strong oxidizing agents such as peroxides or ozone can be established by means of one or more sensors in the washing machine. If the presence of ozone or peroxides is established, then the operation of a circulating element or an air infeed element can be dispensed with.

Ozone can advantageously be used as the oxidizing agent with devices having an ozone generator. Preferably, a device of this type also has an ozone removal device. The polyoxometalate-containing surface is arranged such that said surface can come into contact with water and ozone. For example, in a washing machine in which ozone can be introduced into the outer tub, the polyoxometalate-containing surface is arranged in the outer tub accordingly.

The invention has the advantage that a water-bearing household appliance which has a markedly lower susceptibility to dirt, particularly involving microorganisms is made available in a simple and cost-effective manner and is easy to clean should dirt nevertheless arise.

A particular advantage of the use of polyoxometalate-containing interior surfaces lies therein that said surfaces are able to function for years as a catalytic system without any additional activation or additional energy usage being necessary. Only on the use of an additional circulating element or air infeed element would additional energy consumption occur, although compared with other water-processing methods such as membrane filtration or electrochemical processes, this would be slight. Furthermore, no additional reagents need to be dosed in and activation of the catalyst, for example, by UV radiation can be dispensed with. Additional advantages of polyoxometalate-containing surfaces lie in the improved effectiveness of bleaching agents through the activation thereof, if used. Furthermore, polyoxometalates can have virucidal effects. Therefore, with the present invention, a water-processing system for household appliances having almost no ongoing costs and a long service life is provided.

The invention will now be described in greater detail by reference to FIG. 1.

FIG. 1 is a schematic representation of the present relevant parts of an embodiment of the household appliance according to the invention configured as a washing machine. Other embodiments are conceivable.

The washing machine of the embodiment shown in FIG. 1 has an outer tub 1 in which a drum 2 is rotatably mounted and can be driven by a drive motor 14. For ergonomic reasons, the rotation axis 3 of the drum 2 is oriented upwardly out of the horizontal by a small angle, so that easier access to, and inspection of, the interior of the drum 2 is provided. With this arrangement, in cooperation with specially formed laundry agitators 4 and scooping devices 5 for the washing liquor 6 at the internal surface of the drum jacket, intensification of the flow of washing liquor through the laundry 7 is achieved.

The washing machine also has a water feed system which comprises a water connection fixture for the domestic water supply 8, an electrically controllable valve 9 and a feed pipe 10 which extends to the outer tub and is fed via a detergent dispenser tray 11 from which the feed liquid is able to transport washing agent portions to the outer tub 1.

A heating device 13 is also provided in the outer tub. The valve 9 and the heating device 13 can be controlled by a program control system 12 depending on a program execution plan which can be linked to a time program and/or to the reaching of particular measured values of parameters such as the liquor level, the liquor temperature, the rotary speed of the drum 2, etc. within the washing machine. 15 denotes a pump for the liquid in the outer tub 1.

A water reservoir 17 can store the greywater which has been used for rinsing the laundry. Said greywater can be used for a later washing cycle. For this purpose, the water reservoir 17 is connected via a line ("feed pipe for rinsing liquid") 18 to the valve 9 which also regulates the fresh water feed. A circulating element 19 and an air infeed element 20, which can also be controlled by the program control 12 are provided in the water reservoir 17. With these measures, a particularly efficient oxidation reaction is possible at the interior surface 16 in the water reservoir 17.

Interior surfaces 16 which contain titanium-modified tungstate are applied in the detergent dispenser tray 11, in the outer tub 1 and in the water reservoir 17.

REFERENCE SIGNS

1 Outer tub
2 Laundry drum
3 Rotation axis of the drum
4 Laundry agitators
5 Scooping devices
6 Washing liquor
7 Laundry items 8 Domestic water supply
9 Valve
10 Feed pipe
11 Detergent dispenser tray
12 Program control system
13 Heating device
14 Drive motor
15 Pump
16 Interior surface containing a catalytically active substance (polyoxometalate)
17 Water reservoir
18 Feed pipe for rinsing water
19 Circulating element
20 Air infeed element

The invention claimed is:

1. A water-bearing household appliance comprising:
a tub for accommodating articles to be cleaned, and
a greywater reservoir with at least one interior surface with a polyoxometalate that is embedded within or fixed to the interior surface, wherein the interior surface is configured to contact water during operation of the household appliance, and the water-bearing household appliance does not include a light source configured to irradiate the polyoxometalate.

2. The water-bearing household appliance as claimed in claim 1, wherein the polyoxometalate is a tungstate.

3. The water-bearing household appliance as claimed in claim 2, wherein the tungstate is titanium-modified.

4. The water-bearing household appliance as claimed in claim 1, wherein polyoxometalate is also provided to contact with flowing or static water during operation of the household appliance.

5. The water-bearing household appliance as claimed in claim 1, wherein polyoxometalate is also provided at a throughflow element of the household appliance which is mounted in the flow stream of water in the household appliance.

6. The water-bearing household appliance as claimed in claim 1, wherein polyoxometalate is provided in a water feed system.

7. The water-bearing household appliance as claimed in claim 1, wherein the greywater reservoir comprises a circulating element and/or an air infeed element.

8. The water-bearing household appliance as claimed in claim 1, wherein the household appliance is a dishwasher or a laundry treatment device.

9. The water-bearing household appliance as claimed in claim 8, wherein the household appliance is a laundry treatment device belonging to the group consisting of a washing machine and a washer-dryer.

10. The water-bearing household appliance as claimed in claim 9, wherein the household appliance comprises an outer tub and/or a detergent dispenser tray having polyoxometalate.

11. The water-bearing household appliance as claimed in claim 1, further comprising an ozone generator configured to provide ozone that contacts the polyoxometalate.

12. A method for operating a water-bearing household appliance comprising:
providing a tub for accommodating articles to be cleaned;
providing a greywater reservoir with at least one catalytically active polyoxometalate embedded within or fixed to an interior surface,
contacting the interior surface with water during operation of the household appliance without exposing the interior surface to a light source, and
cleaning the water when the water is brought into contact with the interior surface.

13. The method as claimed in claim 12, further comprising using oxygen as an oxidizing agent and air as a source of the oxygen.

14. The method as claimed in claim 13, wherein an air infeed element provides a sufficient quantity of oxygen in the water to be treated, in order to provide the most complete catalytic reaction possible.

15. The method as claimed in claim 12, wherein a peroxide or ozone is used as an oxidizing agent.

* * * * *

UNITED STATES PATENT AND TRADEMARK OFFICE
CERTIFICATE OF CORRECTION

PATENT NO. : 9,451,866 B2  
APPLICATION NO. : 14/347795  
DATED : September 27, 2016  
INVENTOR(S) : Barrado Franco et al.

It is certified that error appears in the above-identified patent and that said Letters Patent is hereby corrected as shown below:

On the Title Page

Change:
"(73) Assignee: BSH Bosch und Siemens Hausgeräte GmbH, Munich (DE)"

To:
--(73) Assignee: BSH Hausgeräte GmbH, Munich (DE)--.

Signed and Sealed this
Eleventh Day of April, 2017

Michelle K. Lee
*Director of the United States Patent and Trademark Office*